United States Patent
Goel et al.

(10) Patent No.: US 9,014,207 B2
(45) Date of Patent: Apr. 21, 2015

(54) OPPORTUNISTIC 40 MHZ MODE OF TRANSMISSION IN WIRELESS TRANSMITTERS

(71) Applicant: Marvell World Trade Ltd., St. Michael (BB)

(72) Inventors: Sandesh Goel, Fremont, CA (US); Timothy J. Donovan, Livermore, CA (US); Ken Kinwah Ho, San Jose, CA (US); Yungping Hsu, Saratoga, CA (US); Kedar Shirali, Sunnyvale, CA (US); Atul Salhotra, Sunnyvale, CA (US); Tam Tran, San Ramon, CA (US); Chia-Chun Chung, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 104 days.

(21) Appl. No.: 13/891,784

(22) Filed: May 10, 2013

(65) Prior Publication Data

US 2013/0242928 A1    Sep. 19, 2013

Related U.S. Application Data

(63) Continuation of application No. 13/279,520, filed on Oct. 24, 2011, now Pat. No. 8,441,967, which is a continuation of application No. 11/866,754, filed on Oct. 3, 2007, now Pat. No. 8,050,200.

(60) Provisional application No. 60/828,140, filed on Oct. 4, 2006.

(51) Int. Cl.
*H04L 12/413* (2006.01)
*H04W 4/00* (2009.01)
(Continued)

(52) U.S. Cl.
CPC .......... *H04W 72/04* (2013.01); *H04W 74/0808* (2013.01)

(58) Field of Classification Search
USPC .......... 370/278, 431, 445, 310–350, 464–465
See application file for complete search history.

(56) References Cited

U.S. PATENT DOCUMENTS 7,221,681 B2 * 5/2007 Choi et al. ..................... 370/447
7,349,720 B2    3/2008 Sandhu
(Continued)

FOREIGN PATENT DOCUMENTS

EP         1615398 A2    1/2006
EP         1646184 A1    4/2006
WO    WO-2006/069281 A2    6/2006

OTHER PUBLICATIONS

IEEE 802—Kose Und Fischer: "WWiSE Proposal: High throughput extension of the 802.11 Standard" [Online] Mar. 1, 2005, p. I, XP002474129. Retrieved from the Internet: URL: http://pddocserv/specdocs/data/standards/telecom/IEEE802/IEEE802-11/mentor.ieee.org/802.11/file/05/11-05-0149-05-000n-wwise-proposal-high-throughput-extension-to-802-11-standard.doc>[retrievedonMar. 27, 2008]paragraphgraphs [9.14], [9.14.1], [9.14.2.1], [20.3.2.2], [20.3.6], [20.3.10.3]; 90 pages.
(Continued)

*Primary Examiner* — Warner Wong

(57) ABSTRACT

A system including a physical layer module and a control module. The physical layer module is configured to generate a first clear channel assessment for a first sub-channel of a communication channel and generate a second clear channel assessment for a second sub-channel of the communication channel. The first clear channel assessment indicates whether the first sub-channel is free or busy. The second clear channel assessment indicates whether the second sub-channel is free or busy. The control module is configured to, in response to the second sub-channel being busy, extend a duration of the second clear channel assessment by a predetermined period of time, and transmit data via (i) only the first sub-channel or (ii) both the first sub-channel and the second sub-channel based on (a) the first clear channel assessment, (b) the second clear channel assessment, and (c) the extended duration of the first clear channel assessment.

18 Claims, 14 Drawing Sheets

(51) Int. Cl.
*H04W 72/04* (2009.01)
*H04W 74/08* (2009.01)

(56) References Cited

U.S. PATENT DOCUMENTS

| | | | |
|---|---|---|---|
| 7,363,046 B2 | 4/2008 | Beecher | |
| 7,403,539 B1 | 7/2008 | Tang et al. | |
| 7,619,980 B2 | 11/2009 | Lewis | |
| 7,623,494 B2 | 11/2009 | Zhu et al. | |
| 7,672,328 B2 | 3/2010 | Konradsson et al. | |
| 7,804,917 B2* | 9/2010 | French et al. | 375/316 |
| 2002/0188723 A1 | 12/2002 | Choi et al. | |
| 2004/0120424 A1 | 6/2004 | Roberts | |
| 2004/0229566 A1* | 11/2004 | Wang et al. | 455/63.1 |
| 2005/0226270 A1 | 10/2005 | Liu et al. | |
| 2006/0030267 A1* | 2/2006 | Bhardwaj et al. | 455/63.1 |
| 2006/0046739 A1 | 3/2006 | Blosco et al. | |
| 2006/0050728 A1* | 3/2006 | Sung et al. | 370/448 |
| 2006/0114941 A1 | 6/2006 | Silverman et al. | |
| 2006/0159003 A1 | 7/2006 | Nanda et al. | |
| 2006/0274776 A1 | 12/2006 | Malik et al. | |
| 2006/0274863 A1 | 12/2006 | Haentzschel et al. | |
| 2007/0060155 A1 | 3/2007 | Kahana et al. | |
| 2007/0076597 A1 | 4/2007 | Barak et al. | |
| 2007/0218841 A1 | 9/2007 | Wright | |
| 2007/0286122 A1 | 12/2007 | Fonseca | |
| 2008/0112380 A1 | 5/2008 | Fischer | |
| 2008/0144493 A1 | 6/2008 | Yeh | |
| 2008/0192683 A1 | 8/2008 | Han et al. | |
| 2008/0212476 A1* | 9/2008 | Konradsson et al. | 370/235 |
| 2008/0267079 A1 | 10/2008 | Mhatre et al. | |
| 2009/0067403 A1 | 3/2009 | Chan et al. | |
| 2009/0086843 A1 | 4/2009 | Li | |
| 2010/0061362 A1* | 3/2010 | Wang et al. | 370/350 |
| 2010/0067473 A1 | 3/2010 | Cave et al. | |
| 2010/0150064 A1 | 6/2010 | Haddad | |
| 2010/0303131 A1 | 12/2010 | Trachewsky | |

OTHER PUBLICATIONS

IEEE Std 802.11b-1999/Cor 1-2001 (Corrigendum to IEEE Std 802.11b-1999); IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 2: Higher-speed Physical Layer (PHY) extension in the 2.4 GHz band—Corrigendum 1; IEEE Computer Society; Sponsored by the LAN/MAN Standards Committee; 23 pages.

IEEE Std 802.11h™-2003 (Amendment to IEEE Std 802.11™, 1999 Edition (Reaff 2003), as amended by IEEE Stds 802.11a™-1999, 802.11b™-1999, 802.11b™-1999/Cor 1-2001, 802.11d™-2001, and 802.11g™-2003); IEEE Standard for Information technology—Telecommunications and information exchange between systems—Local and metropolitan area networks—Specific Requirements; Part 11: Wireless LAN Medium Access Control (MAC) and physical Layer (PHY) specifications; Amendment 5; Spectrum and Transit Power Management Extensions in the 5 GHz band in Europe; IEEE Computer Society; Sponsored by the LAN/MAN Standards Committee; 74 pages.

IEEE Std 802.11a-1999 (Supplement to IEEE Std 802.11-1999); Supplement to IEEE Standard for Information technology—Telecommunications and information exchange between systems—Local and metropolitan area networks—Specific requirements—Part 11: Wirless LAN Medium Access Control (MAC) and Physical Layer (PHY) specifications: High-speed Physical Layer in the 5 GHz Band; LAN/MAN Standards Committee of the IEEE Computer Society; Sep. 16, 2999 IEEE-SA Standards Board; 91 pages.

IEEE P802.11g/D8.2, Apr. 2003 (Supplement to ANSI/IEEE Std 802.11-1999 (Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

doc.: IEEE 802.11-04/0889r6; IEEE P802.11 Wireless LANs; TGn Sync Proposal Technical Specification; May 18, 2005; Syed Aon Mujtaba; Agere Systems Inc.; 131 pages.

doc.: IEEE 802.11-06/1027r2; IEEE P802.11 Wirless LANs; Normative Text for 40/20 MHz Operation using Extension Channel CCA; Sep. 29, 2006; 3 pages.

* cited by examiner

| Counter | Condition |
|---|---|
| CCA_extension Strong Count | CCA_e = 1 AND RSSI_e = 1 |
| CCA_extension Weak Count | CCA_e = 1 AND RSSI_e = 0 |
| CCA_control Count | CCA_c = 1 |
| CCA Count | CCA (combined based on currently selected mode) = 1 |
| CCA_NAV Count | CCA (combined based on currently selected mode) = 1 OR NAV = 0 |
| TX_PE_20 Count | MAC transmitting at 20MHz |
| TX_PE_40 Count | MAC transmitting at 40MHz |
| RX_20 Count | MAC receiving at 20MHz data addressed to MAC |
| RX_40 Count | MAC receiving at 40MHz data addressed to MAC |

FIG. 6B

OPPORTUNISTIC 40 MHZ MODE OF TRANSMISSION IN WIRELESS TRANSMITTERS

CROSS-REFERENCE TO RELATED APPLICATIONS

This is a continuation of U.S. patent application Ser. No. 13/279,520, filed on Oct. 24, 2011, which is a continuation of U.S. patent application Ser. No. 11/866,754 (now U.S. Pat. No. 8,050,200), filed on Oct. 3, 2007, which claims the benefit of U.S. Provisional Application No. 60/828,140, filed on Oct. 4, 2006. The entire disclosures of the above application are incorporated herein by reference.

FIELD

The present disclosure relates to communication systems, and more particularly to selecting transmission channels in wireless transmitters.

BACKGROUND

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

I.E.E.E. sections 802.11, 802.11(a), 802.11(b), 802.11(g), 802.11(h), and 802.11(n) (collectively sections 802.11), which are incorporated herein by reference in their entirety, define ways for configuring wireless networks and devices. According to these standards, wireless network devices may operate in either an ad-hoc mode or an infrastructure mode.

Referring now to FIGS. 1 and 2, in the ad-hoc mode, each client station 10-1, 10-2, . . . , and 10-N (collectively client stations 10) communicates directly with other client stations 10 without requiring an access point (AP). In FIG. 2, in the infrastructure mode, each client station 20-1, 20-2, . . . , and 20-M (collectively client stations 20) communicates with other client stations 20 through an AP 24. The AP 24 may provide a connection to a network 26, a server 28, and/or for the Internet 30.

Referring generally to FIGS. 3A-3B, a wireless network device (hereinafter device) 50 is shown. The device 50 may be the AP 24 or one of the client stations 10, 20. In FIG. 3A, the device 50 may comprise at least one antenna 52, a physical layer (PHY) module 54, and a medium access controller (MAC) module 56. Additionally, the device 50 may include a processor 58 and other components. The PHY module 54 may communicate with the medium (i.e., air) via the antenna 52. The PHY module 54 may comprise a radio frequency (RF) transceiver module 55 that transmits and receives data to and from the medium via the antenna 52. The MAC module 56 may communicate with the PHY module 54 and the processor 58.

In FIG. 3B, the RF transceiver module 55 may comprise a transmitter module 70 that transmits data and a receiver module 72 that receives data in the form of modulated RF carriers via the antenna 52. The transmitter module 70 may comprise an encoder module, a modulator module, an analog-to-digital converter (ADC) module, etc. (all not shown). The receiver module 72 may comprise an automatic gain control (AGC) module, a filter module, an ADC converter module, a demodulator module, a decoder module, etc. (all not shown).

802.11 provides that data may be simultaneously transmitted via multiple channels in a predetermined frequency-band. For example, devices that comply with section 802.11(a) may transmit data at 20 MHz via eight 20 MHz channels in a 5 GHz frequency-band; devices that comply with section 802.11(b) may transmit data at 20 MHz via fourteen 20 MHz channels in a 2.4 GHz frequency-band, etc.

Devices that comply with section 802.11(n) may transmit data at 20 MHz or 40 MHz via a 40 MHz channel. The 40 MHz channel may comprise two 20 MHz channels. A first 20 MHz channel is called a primary channel or a control channel. A second 20 MHz channel is called a secondary channel or an extension channel. The 802.11(n)-compliant devices may transmit data at 40 MHz via the 40 MHz channel when communicating with other 802.11(n)-compliant devices. Additionally, 802.11(n)-compliant devices may transmit data at 20 MHz via the control channel when communicating with the devices that comply with 802.11 sections other than 802.11(n).

A wireless network (hereinafter network) may include devices that comply with different 802.11 sections. For example, the network may comprise the AP 24 and a first set of client stations 20 that complies with section 802.11(n). Additionally, the network may include a second set of client stations 20 that comply with 802.11 sections other than section 802.11(n) (e.g., 802.11(a), 802.11(b), 802.11(g), etc.). The AP 24 may transmit and receive data at 40 MHz via the 40 MHz channel when communicating with the first set of client stations 20 and may transmit and receive data via the 20 MHz control channel when communicating with the second set of client stations 20.

Occasionally, the AP 24 may transmit data at 40 MHz when data transmitted by devices in other networks may be present in the extension channel. For example, other networks may include devices that comply with 802.11 sections other than section 802.11(n) and that transmit data at 20 MHz in a channel that may overlap with the MHz extension channel of the AP 24. Consequently, collisions may occur when the AP 24 transmits data at 40 MHz.

Additionally, collisions may occur when the AP 24 transmits data at 40 MHz while other devices that comply with 802.11 sections other than section 802.11(n) communicate in the network at 20 MHz via the extension channel. Collisions may also occur when multiple devices that comply with the section 802.11(n) simultaneously transmit data in the network.

When collisions occur, data may get corrupted. Corrupted data may be discarded when received. When data received is corrupted, the data may have to be retransmitted. Thus, collisions may decrease throughput and quality of service (QoS) of the network.

To minimize collisions, devices in wireless networks utilize a carrier sense multiple access (CSMA) protocol to determine when a channel is free to transmit data. Ideally, only one device may transmit data via the channel at a given time. Typically, the devices "listen" for activity (i.e., the devices sense presence or absence of RF carriers) in the channel before transmitting data via that channel. Listening for activity is generally referred to as carrier sensing (CS). Since multiple devices perform CS by simultaneously accessing the medium (i.e., air), the protocol is called carrier sense multiple access protocol. Activity in the channel may also be sensed by performing energy detection (ED), wherein presence or absence of RF energy in the channel is detected.

Specifically, the PHY module 54 may generate clear channel assessments (CCAs) for the control and extension channels based on whether radio frequency (RF) activity is present or absent in the channel. The CCAs may indicate whether the channels are busy or free. Typically, the CCA for the channel is asserted (i.e., when CCA=1) when a channel is busy, and the CCA for the channel is cleared when the channel is free (i.e., when CCA=0). The terms clear, free, and idle are used interchangeably and synonymously throughout this disclosure.

The PHY module 54 may communicate the CCAs to the MAC module 56. Based on the CCAs, the MAC module 56 may decide whether to transmit data via the channel. For example, the MAC module 56 may decide that data may be transmitted via a channel when the channel is free (i.e., when CCA=0). Additionally, the MAC module 56 may decide to "back off" (i.e., to not transmit data) when the channel is busy (i.e., when CCA=1).

SUMMARY

A system comprises a signal processing module and a control module. The signal processing module receives a first clear channel assessment (CCA) signal for a first sub-channel of a communication channel, increases a pulse width of the first CCA signal by a predetermined period of time, and generates a second CCA signal. The control module receives the second CCA signal and a third CCA signal for a second sub-channel of the communication channel. The control module transmits data via one of the second sub-channel and the communication channel based on the second and third CCA signals.

In another feature, the first and second sub-channels include extension and control channels of the communication channel, respectively. The bandwidth of each of the first and second sub-channels is 20 MHz. The bandwidth of the communication channel is 40 MHz.

In another feature, the control module generates a value for the predetermined period of time based on an amount of radio frequency (RF) activity in the first sub-channel.

In another feature, the control module transmits data via the second sub-channel at a transmission rate of the second sub-channel when the third CCA signal indicates that the second sub-channel is clear and when the second CCA signal indicates that the first sub-channel is busy.

In another feature, the control module transmits data via the communication channel at a transmission rate of the communication channel when the second and third CCA signals indicate that the first and second sub-channels are clear, respectively.

In another feature, the control module does not transmit data when the third CCA signal indicates that the second sub-channel is busy.

In another feature, the control module transmits data via the second sub-channel at a transmission rate of the communication channel when the third CCA signal indicates that the second sub-channel is clear.

In another feature, the control module does not transmit data via the communication channel and via the second sub-channel when one of the second and third CCA signals indicates that one of the first and second sub-channels is busy, respectively.

In another feature, the system further comprises a rate control module that receives feedback from the control module when data is transmitted via one of the second sub-channel and the communication channel and that determines modulation and coding scheme (MCS) rates based on the feedback.

In another feature, a medium access controller (MAC) comprises the system that communicates with a physical layer (PHY) module and that receives the first and third CCA signals from the PHY module, wherein the PHY module complies with I.E.E.E. section 802.11(n).

In another feature, the system further comprises the PHY module, wherein the PHY module comprises a carrier sensing module that senses radio frequency (RF) carriers in at least one of the first and second sub-channels and that generates the first and third CCA signals indicating whether the at least one of the first and second sub-channels is one of clear and busy.

In another feature, the system further comprises the PHY module, wherein the PHY module comprises an energy sensing module that senses radio frequency (RF) energy in at least one of the first and second sub-channels and that generates the first and third CCA signals indicating whether the at least one of the first and second sub-channels is one of clear and busy.

In another feature, the system further comprises the PHY module, wherein the PHY module comprises a signal strength sensing module that senses strengths of RF signals detected in the first and second sub-channels. The signal strength sensing module compares the strengths to first and second predetermined thresholds, respectively. The signal strength sensing module generates first and second relative signal strength index (RSSI) signals that indicate whether the strengths are greater than or equal to the first and second predetermined thresholds, respectively.

In another feature, the PHY module generates the first and third CCA signals based on the first and second RSSI signals.

In another feature, the control module determines whether the communication channel is one of clear and busy based on the first and second RSSI signals.

In another feature, the MAC comprises a counter module that generates a plurality of counts based on at least one of states of the first, second, and third CCA signals and activity in the first and second sub-channels.

In another feature, the system further comprises a mode control module that communicates with the MAC, that receives the counts from the counter module, and that determines a transmit mode of the MAC based on the counts, wherein the transmit mode is one of first and second transmit modes.

In another feature, the MAC transmits data via the second sub-channel at a rate of the second sub-channel when the MAC is in the first transmit mode. The MAC transmits data via the communication channel at a rate of the communication channel when the MAC is in the second transmit mode.

In still other features, a method comprises receiving a first clear channel assessment (CCA) signal for a first sub-channel of a communication channel and generating a second CCA signal by increasing a pulse width of the first CCA signal by a predetermined period of time. The method further comprises receiving the second CCA signal and a third CCA signal for a second sub-channel of the communication channel. The method further comprises transmitting data via one of the second sub-channel and the communication channel based on the second and third CCA signals.

In another feature, the first and second sub-channels include extension and control channels of the communication channel, respectively. The bandwidth of each of the first and second sub-channels is 20 MHz. The bandwidth of the communication channel is 40 MHz.

In another feature, the method further comprises generating a value for the predetermined period of time based on an amount of radio frequency (RF) activity in the first sub-channel.

In another feature, the method further comprises transmitting data via the second sub-channel at a transmission rate of the second sub-channel when the third CCA signal indicates that the second sub-channel is clear and when the second CCA signal indicates that the first sub-channel is busy.

In another feature, the method further comprises transmitting data via the communication channel at a transmission rate of the communication channel when the second and third CCA signals indicate that the first and second sub-channels are clear, respectively.

In another feature, the method further comprises not transmitting data when the third CCA signal indicates that the second sub-channel is busy.

In another feature, the method further comprises transmitting data via the second sub-channel at a transmission rate of the communication channel when the third CCA signal indicates that the second sub-channel is clear.

In another feature, the method further comprises not transmitting data via the communication channel and via the second sub-channel when one of the second and third CCA signals indicates that one of the first and second sub-channels is busy, respectively.

In another feature, the method further comprises receiving feedback after transmitting data via one of the second sub-channel and the communication channel and determining modulation and coding scheme (MCS) rates based on the feedback.

In another feature, the method further comprises communicating with a physical layer (PHY) module and receiving the first and third CCA signals from the PHY module, wherein the PHY module complies with I.E.E.E. section 802.11(n).

In another feature, the method further comprises sensing radio frequency (RF) carriers in at least one of the first and second sub-channels and generating the first and third CCA signals indicating whether the at least one of the first and second sub-channels is one of clear and busy.

In another feature, the method further comprises sensing radio frequency (RF) energy in at least one of the first and second sub-channels and generating the first and third CCA signals indicating whether the at least one of the first and second sub-channels is one of clear and busy.

In another feature, the method further comprises sensing strengths of RF signals detected in the first and second sub-channels and comparing the strengths to first and second predetermined thresholds, respectively. The method further comprises generating first and second relative signal strength index (RSSI) signals that indicate whether the strengths are greater than or equal to the first and second predetermined thresholds, respectively.

In another feature, the method further comprises generating the first and third CCA signals based on the first and second RSSI signals.

In another feature, the method further comprises determining whether the communication channel is one of clear and busy based on the first and second RSSI signals.

In another feature, the method further comprises generating a plurality of counts based on at least one of states of the first, second, and third CCA signals and activity in the first and second sub-channels.

In another feature, the method further comprises determining a transmit mode based on the counts, wherein the transmit mode is one of first and second transmit modes.

In another feature, the method further comprises transmitting data via the second sub-channel at a rate of the second sub-channel in the first transmit mode.

In another feature, the method further comprises transmitting data via the communication channel at a rate of the communication channel in the second transmit mode.

In still other features, a system comprises signal processing means for processing signals that receives a first clear channel assessment (CCA) signal for a first sub-channel of a communication channel, that increases a pulse width of the first CCA signal by a predetermined period of time, and that generates a second CCA signal. The system further comprises control means for controlling data transmission that receives the second CCA signal and a third CCA signal for a second sub-channel of the communication channel. The control means transmits data via one of the second sub-channel and the communication channel based on the second and third CCA signals.

In another feature, the first and second sub-channels include extension and control channels of the communication channel, respectively. The bandwidth of each of the first and second sub-channels is 20 MHz. The bandwidth of the communication channel is 40 MHz.

In another feature, the control means generates a value for the predetermined period of time based on an amount of radio frequency (RF) activity in the first sub-channel.

In another feature, the control means transmits data via the second sub-channel at a transmission rate of the second sub-channel when the third CCA signal indicates that the second sub-channel is clear and when the second CCA signal indicates that the first sub-channel is busy.

In another feature, the control means transmits data via the communication channel at a transmission rate of the communication channel when the second and third CCA signals indicate that the first and second sub-channels are clear, respectively.

In another feature, the control means does not transmit data when the third CCA signal indicates that the second sub-channel is busy.

In another feature, the control means transmits data via the second sub-channel at a transmission rate of the communication channel when the third CCA signal indicates that the second sub-channel is clear.

In another feature, the control means does not transmit data via the communication channel and via the second sub-channel when one of the second and third CCA signals indicates that one of the first and second sub-channels is busy, respectively.

In another feature, the system further comprises rate control means for controlling modulation and coding scheme (MCS) rates that receives feedback from the control means when data is transmitted via one of the second sub-channel and the communication channel, and that determines the MCS rates based on the feedback.

In another feature, a medium access controller (MAC) comprises the system, wherein the MAC communicates with a physical layer (PHY) module and receives the first and third CCA signals from the PHY module, wherein the PHY module complies with I.E.E.E. section 802.11(n).

In another feature, the system further comprises the PHY module, wherein the PHY module comprises carrier sensing means for sensing radio frequency (RF) carriers in at least one of the first and second sub-channels and for generating the first and third CCA signals indicating whether the at least one of the first and second sub-channels is one of clear and busy.

In another feature, the system further comprises the PHY module, wherein the PHY module comprises energy sensing means for sensing radio frequency (RF) energy in at least one of the first and second sub-channels and for generating the first and third CCA signals indicating whether the at least one of the first and second sub-channels is one of clear and busy.

In another feature, the system further comprises the PHY module, wherein the PHY module comprises signal strength sensing means for sensing signal strength that senses strengths of RF signals detected in the first and second sub-channels. The signal strength sensing means compares the strengths to first and second predetermined thresholds, respectively. The signal strength sensing means generates first and second relative signal strength index (RSSI) signals that indicate whether the strengths are greater than or equal to the first and second predetermined thresholds, respectively.

In another feature, the PHY module generates the first and third CCA signals based on the first and second RSSI signals.

In another feature, the control means determines whether the communication channel is one of clear and busy based on the first and second RSSI signals.

In another feature, the MAC comprises counting means for generating a plurality of counts based on at least one of states of the first, second, and third CCA signals and activity in the first and second sub-channels.

In another feature, the system further comprises mode control means for controlling transmit modes, wherein the mode control means communicates with the MAC, receives the counts from the counting means, and determines a transmit mode of the MAC based on the counts, wherein the transmit mode is one of first and second transmit modes.

In another feature, the MAC transmits data via the second sub-channel at a rate of the second sub-channel when the MAC is in the first transmit mode. The MAC transmits data via the communication channel at a rate of the communication channel when the MAC is in the second transmit mode.

In still other features, a computer program executed by a processor comprises receiving a first clear channel assessment (CCA) signal for a first sub-channel of a communication channel and generating a second CCA signal by increasing a pulse width of the first CCA signal by a predetermined period of time. The computer program further comprises receiving the second CCA signal and a third CCA signal for a second sub-channel of the communication channel. The computer program further comprises transmitting data via one of the second sub-channel and the communication channel based on the second and third CCA signals.

In another feature, the first and second sub-channels include extension and control channels of the communication channel, respectively. The bandwidth of each of the first and second sub-channels is 20 MHz. The bandwidth of the communication channel is 40 MHz.

In another feature, the computer program further comprises generating a value for the predetermined period of time based on an amount of radio frequency (RF) activity in the first sub-channel.

In another feature, the computer program further comprises transmitting data via the second sub-channel at a transmission rate of the second sub-channel when the third CCA signal indicates that the second sub-channel is clear and when the second CCA signal indicates that the first sub-channel is busy.

In another feature, the computer program further comprises transmitting data via the communication channel at a transmission rate of the communication channel when the second and third CCA signals indicate that the first and second sub-channels are clear, respectively.

In another feature, the computer program further comprises not transmitting data when the third CCA signal indicates that the second sub-channel is busy.

In another feature, the computer program further comprises transmitting data via the second sub-channel at a transmission rate of the communication channel when the third CCA signal indicates that the second sub-channel is clear.

In another feature, the computer program further comprises not transmitting data via the communication channel and via the second sub-channel when one of the second and third CCA signals indicates that one of the first and second sub-channels is busy, respectively.

In another feature, the computer program further comprises receiving feedback after transmitting data via one of the second sub-channel and the communication channel and determining modulation and coding scheme (MCS) rates based on the feedback.

In another feature, the computer program further comprises communicating with a physical layer (PHY) module and receiving the first and third CCA signals from the PHY module, wherein the PHY module complies with I.E.E.E. section 802.11(n).

In another feature, the computer program further comprises sensing radio frequency (RF) carriers in at least one of the first and second sub-channels and generating the first and third CCA signals indicating whether the at least one of the first and second sub-channels is one of clear and busy.

In another feature, the computer program further comprises sensing radio frequency (RF) energy in at least one of the first and second sub-channels and generating the first and third CCA signals indicating whether the at least one of the first and second sub-channels is one of clear and busy.

In another feature, the computer program further comprises sensing strengths of RF signals detected in the first and second sub-channels and comparing the strengths to first and second predetermined thresholds, respectively. The computer program further comprises generating first and second relative signal strength index (RSSI) signals that indicate whether the strengths are greater than or equal to the first and second predetermined thresholds, respectively.

In another feature, the computer program further comprises generating the first and third CCA signals based on the first and second RSSI signals.

In another feature, the computer program further comprises determining whether the communication channel is one of clear and busy based on the first and second RSSI signals.

In another feature, the computer program further comprises generating a plurality of counts based on at least one of states of the first, second, and third CCA signals and activity in the first and second sub-channels.

In another feature, the computer program further comprises determining a transmit mode based on the counts, wherein the transmit mode is one of first and second transmit modes.

In another feature, the computer program further comprises transmitting data via the second sub-channel at a rate of the second sub-channel in the first transmit mode.

In another feature, the computer program further comprises transmitting data via the communication channel at a rate of the communication channel in the second transmit mode.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodi-

BRIEF DESCRIPTION OF THE DRAWINGS

The present disclosure will become more fully understood from the detailed description and the accompanying drawings, wherein:

FIG. 6B depicts a table comprising various counts generates by a medium access controller (MAC) module according to the present disclosure;

DETAILED DESCRIPTION

Figure 1:
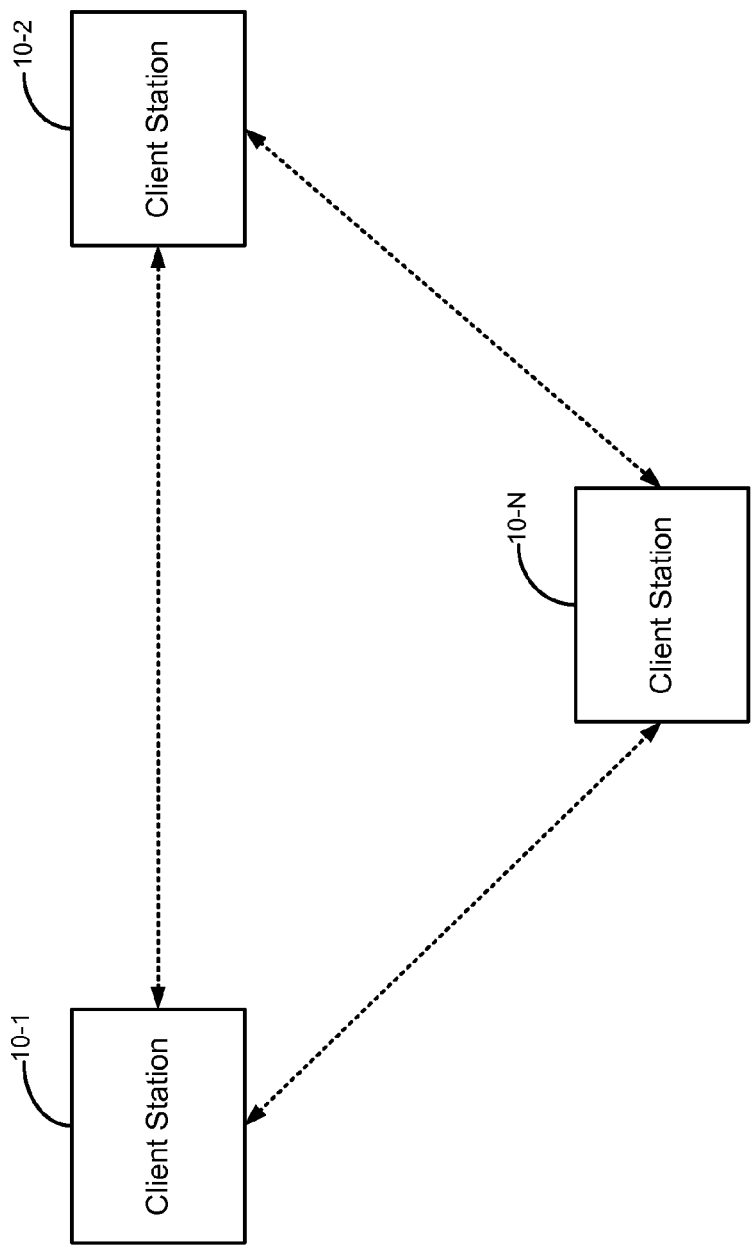
FIG. 1 is a functional block diagram of an exemplary wireless network operating in ad-hoc mode according to the prior art.
Figure 2:
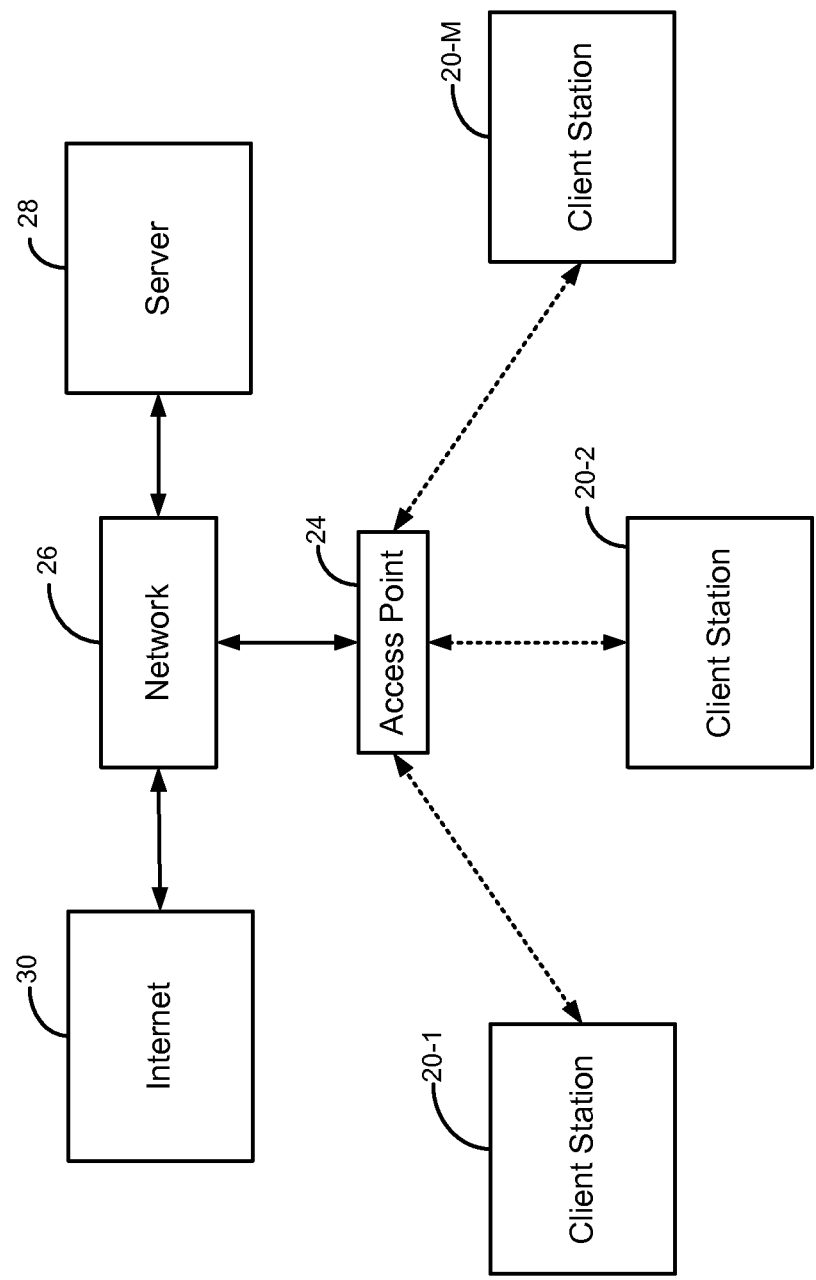
FIG. 2 is a functional block diagram of an exemplary wireless network operating in infrastructure mode according to the prior art.
Figure 3A:
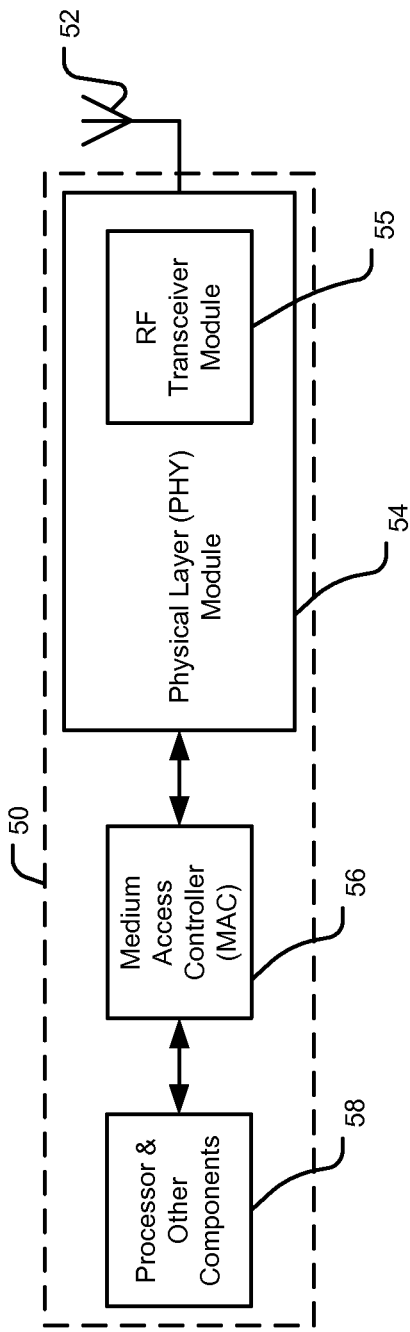
FIG. 3A is a functional block diagram of an exemplary wireless network device according to the prior art.
Figure 3B:
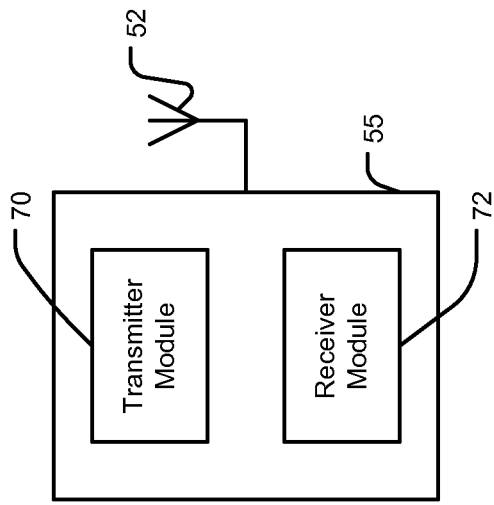
FIG. 3B is a functional block diagram of a transceiver in a wireless network device according to the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

In wireless network devices that comply with I.E.E.E. section 802.11(n), physical layer (PHY) modules provide medium access controller (MAC) modules clear channel assessments (CCAs) for control and extension channels. Based on the CCAs (i.e., based on whether the control and/or the extension channel is free), MAC modules determine whether to transmit data via the control channel portion of a 40 MHz channel, via the entire 40 MHz channel, or not at all. Typically, the MAC modules may operate in two modes. In a first mode, which may be called an aggressive mode, the MAC modules may ignore the CCAs for the extension channel and transmit data at 40 MHz when the control channel is free. In a second mode, which may be called a conservative mode, the MAC modules may not transmit data at all unless both control and extension channels are free.

Figure 4B:
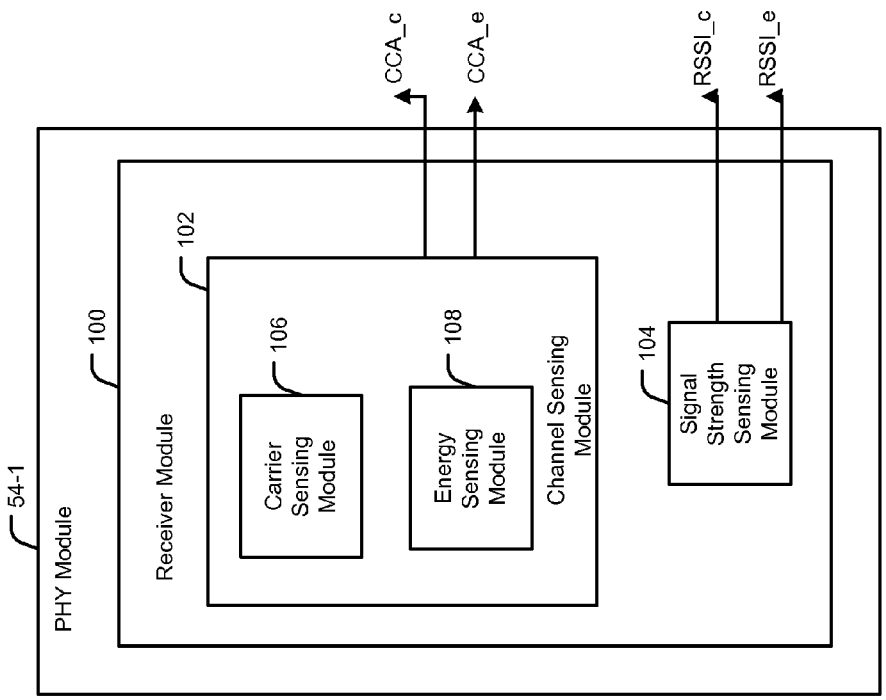
FIG. 4B is a functional block diagram of an exemplary receiver in the wireless network device of FIG. 4A.
Figure 4A:
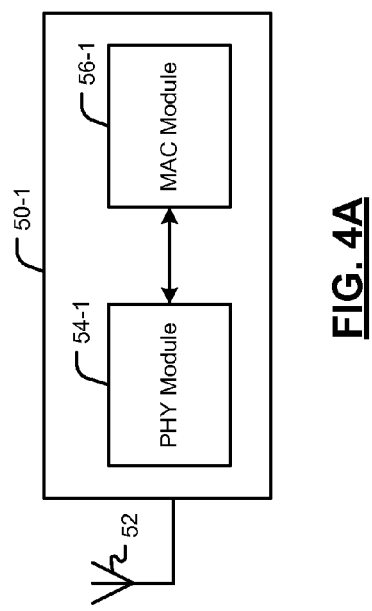
FIG. 4A is a functional block diagram of an exemplary wireless network device.
Figure 4C:
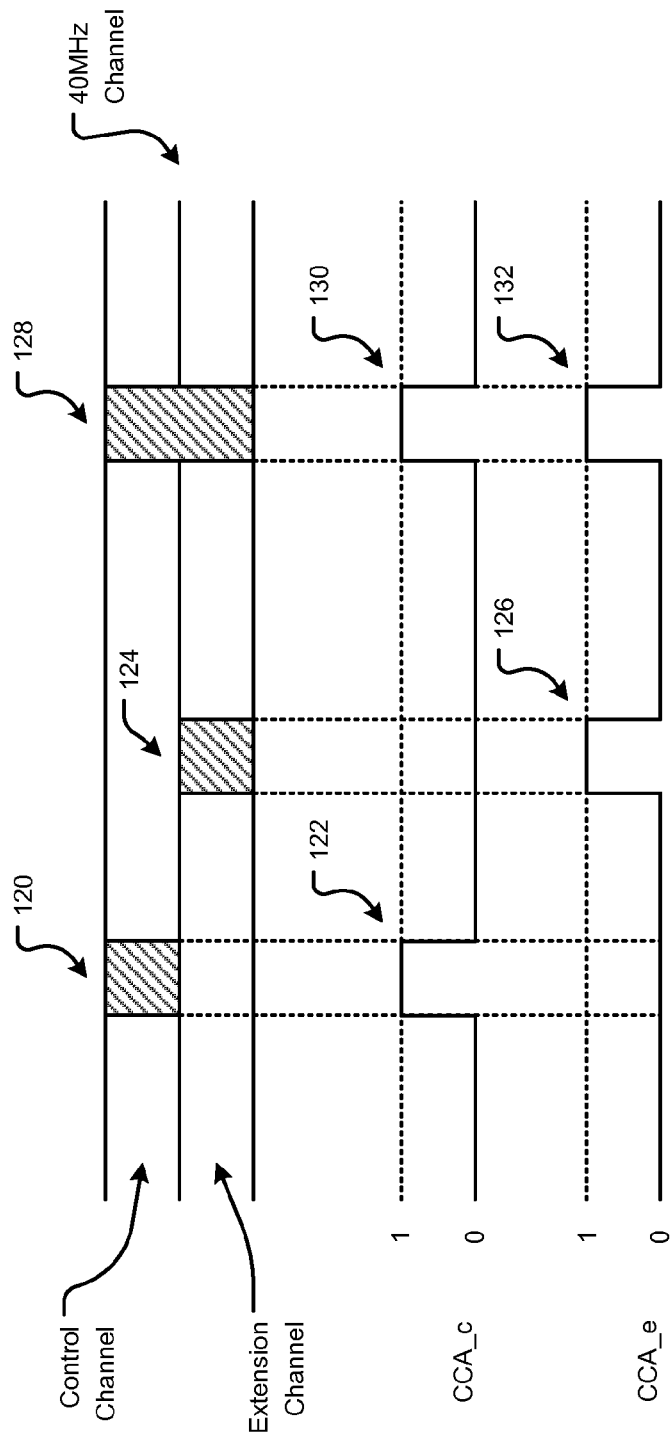
FIG. 4C depicts clear channel assessment (CCA) signals generated by the receiver of FIG. 4B.

Referring now to FIGS. 4A-4C, a wireless network device (hereinafter device) 50-1 that generates various clear channel assessment (CCA) signals is shown. The device 50-1 may comply with I.E.E.E. section 802.11(n) and may communicate via a 40 MHz channel that includes a 20 MHz control channel and a 20 MHz extension channel.

In FIG. 4A, the device 50-1 is shown to include the antenna 52, a physical layer (PHY) module 54-1, and a medium access controller (MAC) module 56-1. The antenna 52 may communicate received signals to the PHY module 54-1. The PHY module 54-1 may generate a CCA signal for the control channel (CCA_c) and a CCA signal for the extension channel (CCA_e).

Additionally, the PHY module 54-1 may generate signals that indicate a relative signal strength index (RSSI) of radio frequency (RF) signals sensed in the control and extension channels. The signals may be called RSSI_c and RSSI_e, respectively. The PHY module 54-1 may communicate the CCA_c, CCA_e, RSSI_c, and RSSI_e signals to the MAC module 56-1. The MAC module 56-1 may determine the CCA for the 40 MHz channel (hereinafter the CCA) based on CCA_c and/or CCA_e.

Based on the CCA, CCA_c, and/or CCA_e, the MAC module 56-1 may determine whether to transmit data at 20 MHz via the control channel, at 40 MHz via the 40 MHz channel, or not at all. For example, the MAC module 56-1 may determine that data may be transmitted at 40 MHz via the 40 MHz channel when CCA=0 or not to transmit data at all when CCA=1.

In FIG. 4B, the PHY module 54-1 may comprise a receiver module 100. The receiver module 100 may generate the CCA_c, CCA_e, RSSI_c, and RSSI_e signals as follows. The receiver module 100 may comprise a channel sensing module 102 and a signal strength sensing module 104. The channel sensing module 102 may comprise a carrier sensing module 106 and an energy sensing module 108. The carrier sensing module 106 may sense presence or absence of RF carriers in the control and/or extension channels. The energy sensing module 108 may detect RF energy in the control and/or extension channels.

The signal strength sensing module 104 may determine the RSSI of RF signals that may be sensed in the control and/or extension channels. The signal strength sensing module 104 may generate a high RSSI_c and/or RSSI_e signal (i.e., RSSI_c=1 and/or RSSI_e=1) when the RSSI of RF signals sensed in the control and/or extension channels is greater than or equal to a predetermined threshold. The predetermined threshold for the control channel may be different than the predetermined threshold for the extensions channel.

In FIG. 4C, when the carrier sensing module 106 and/or the energy detection module 108 detects RF activity 120 in the control channel, the receiver module 100 may generate a high CCA_c signal 122 (i.e., CCA_c=1). CCA_c=1 may indicate that the control channel is busy. When the carrier sensing module 106 and/or the energy detection module 108 detects RF activity 124 in the extension channel, the receiver module 100 may generate a high CCA_e signal 126 (i.e., CCA_e=1). CCA_e=1 may indicate that the extension channel is busy.

When the carrier sensing module 106 and/or the energy detection module 108 detects RF activity 128 in the control and extension channels, the receiver module 100 may generate a high CCA_c signal 130 (i.e., CCA_c=1) and a high CCA_e signal 132 (i.e., CCA_e=1). CCA_c=1 and CCA_e=1 may indicate that the control and extension channels are busy. Additionally, when the RF signals sensed in the control or extension channel are very strong, the receiver module 100 may set CCA_c=1 and CCA_e=1.

The PHY module 54-1 may communicate CCA_c and CCA_e signals to the MAC module 56-1. Based on the state of CCA_c and/or CCA_e signals, the MAC module 56-1 may determine the CCA for the 40 MHz channel. Based on the CCA, CCA_c, and/or CCA_e, the MAC module 56-1 may determine whether to transmit data at 20 MHz via the control channel, at 40 MHz via the 40 MHz channel, or not at all. Generally, when CCA_c=1 (i.e., when the control channel is busy), the MAC module 56-1 may decide to wait or backoff for a period of time before deciding whether to transmit data. Thereafter, the MAC module 56-1 may check CCA_c again to determine whether to transmit data.

Specifically, the MAC module 56-1 may determine the CCA aggressively or conservatively. Accordingly, the MAC module 56-1 may operate in the aggressive mode or the conservative mode, respectively. In the aggressive mode, the MAC module 56-1 may disregard the extension channel (i.e., CCA_e) and may determine CCA for the 40 MHz channel based on CCA_c (i.e., CCA=CCA_c). Specifically, the MAC module 56-1 may determine that data may be transmitted at 40 MHz when the control channel is free (i.e., when CCA=CCA_c=0). Accordingly, the MAC module 56-1 may determine that data may be transmitted at 40 MHz when the control channel is free although the extension channel may be busy. Collisions may occur, however, if data is transmitted at 40 MHz when the control channel is free but the extension channel is busy.

Alternatively, in the conservative mode, the MAC module 56-1 may determine the CCA based on a logical OR of CCA_c and CCA_e (i.e., CCA=(CCA_c OR CCA_e)). Thus, CCA=1 when CCA_c=1 or CCA_e=1, and CCA=0 only when CCA_c=0 and CCA_e=0. Specifically, the MAC module 56-1 may determine that data may be transmitted only when both control and extension channels are free. Additionally, the MAC module 56-1 may determine that data may not be transmitted at all when the control channel or the extension channel is busy. Accordingly, the MAC module 56-1 may determine that data may not be transmitted at all when the extension channel is busy although the control channel may be free to transmit data at 20 MHz. Consequently, the throughput of the 40 MHz channel may decrease.

The present disclosure discloses an opportunistic mode that minimizes collisions and maximizes throughput. In the opportunistic mode, a MAC module may increase a pulse width of the CCA_e signal by a programmable duration and may generate a signal called CCA_e_stretched. The MAC module may backoff and determine the CCA for the 40 MHz channel based on the CCA-c signal. When the MAC module is ready to transmit based on the CCA, the MAC module may determine whether to transmit data at 20 MHz or 40 MHz based on whether the CCA_e_stretched signal is asserted or clear, respectively.

Figure 5A:
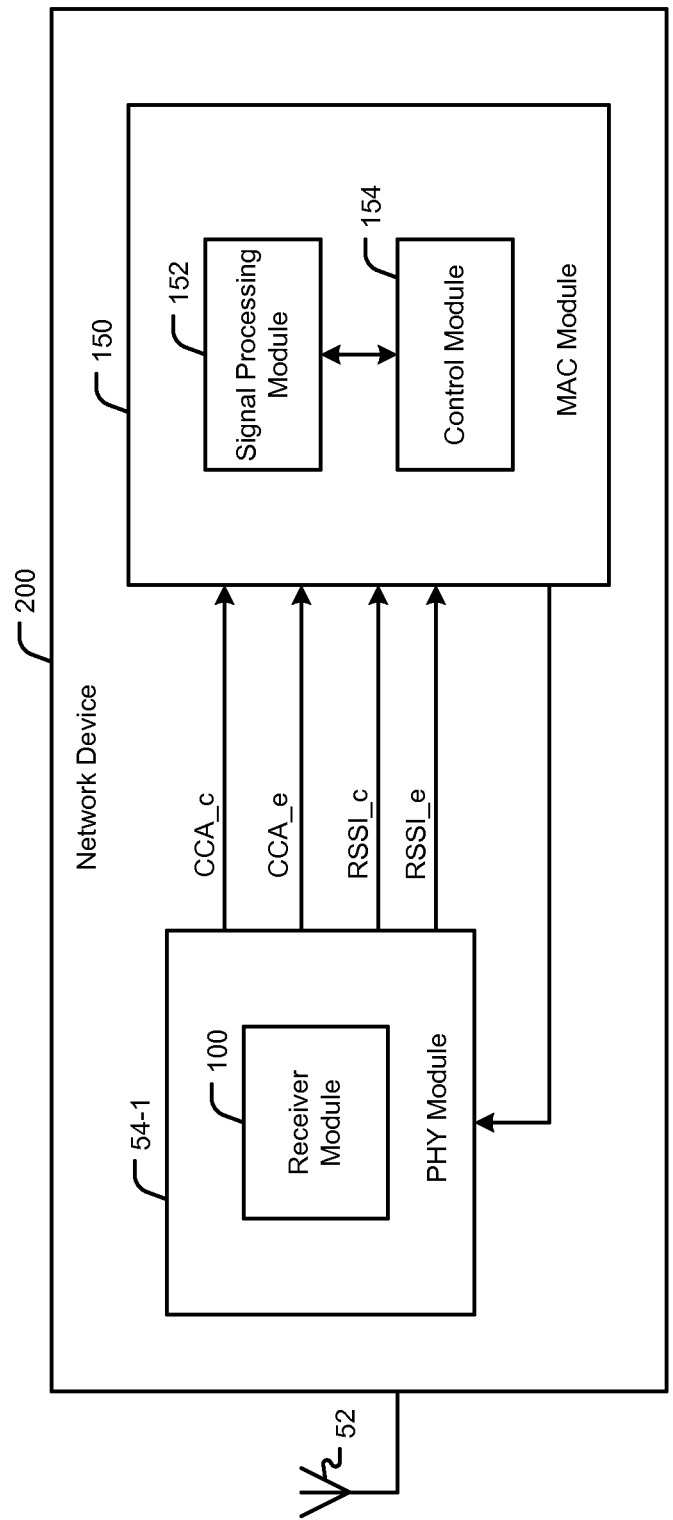
FIG. 5A is a functional block diagram of an exemplary wireless network device that may transmit data in an opportunistic mode according to the present disclosure.
Figure 5B:
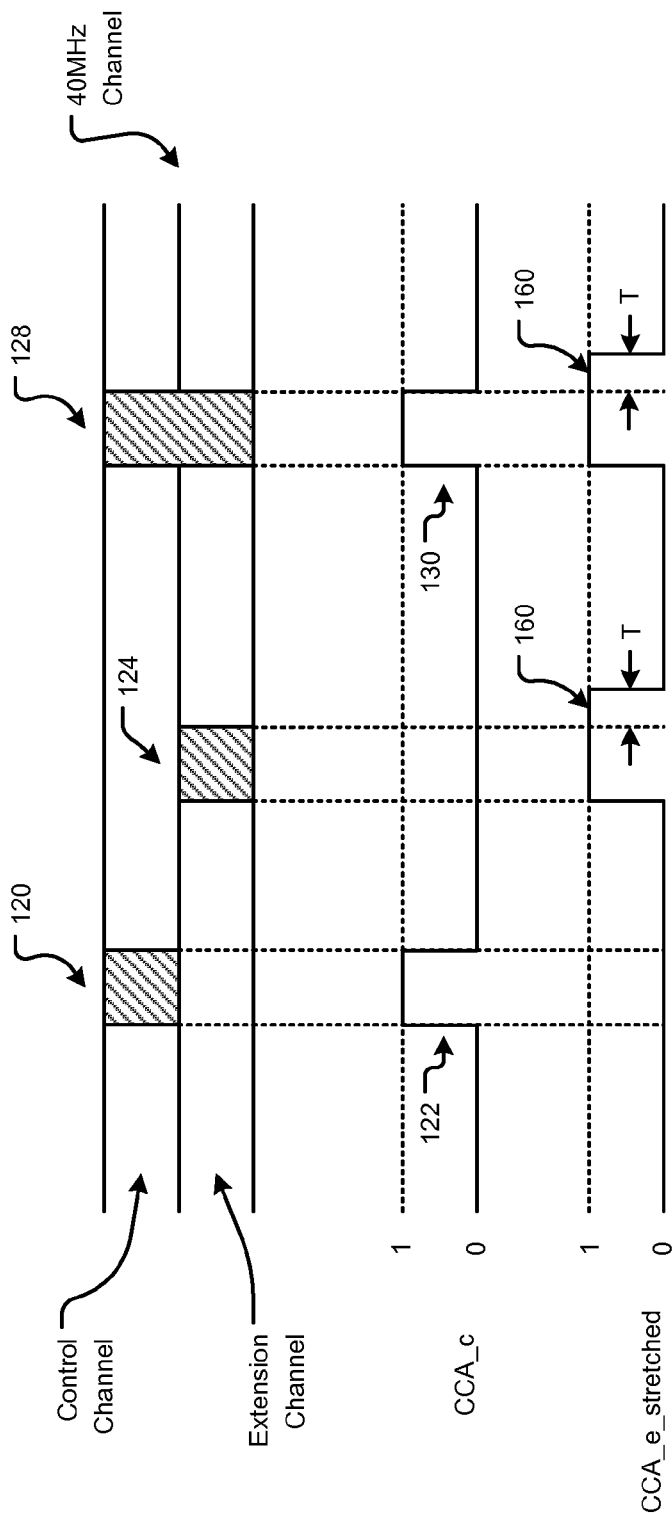
FIG. 5B depicts CCA signals generated according to the present disclosure.

Referring now to FIGS. 5A and 5B, a device 200 is shown to comprise the antenna 52, the PHY module 54-1, and a MAC module 150. The MAC module 150 may determine whether to transmit data at 20 MHz via the control channel or at 40 MHz via the control and extension channels in the opportunistic mode as follows. In FIG. 5A, the MAC module 150 may comprise a signal processing module 152 and a control module 154. The MAC module 150 may receive the CCA_c, CCA_e, RSSI_c, and RSSI_e signals from the PHY module 54-1. The signal processing module 152 may increase the pulse width of the CCA_e signal by a programmable duration T and may generate a CCA_e_stretched signal 160 as shown in FIG. 5B.

The MAC module 150 may determine the CCA based on the CCA_c signal (i.e., CCA=CCA_c) and may be ready to transmit data when CCA=0 (i.e., when the control channel is free). When CCA=0, the control module 154 may determine in real time whether to transmit data at 20 MHz via the control channel or at 40 MHz via both control and extension channels based on a state of the CCA_e_stretched signal.

Specifically, when CCA=0, if the CCA_e_stretched signal is asserted (i.e., if CCA_e_stretched=1), the control module 154 may determine that the extension channel is busy and that the data may be transmitted at 20 MHz via the control channel.

On the other hand, when CCA=0, if the CCA_e_stretched signal is not asserted (i.e., if CCA_e_stretched=0), the control module 154 may determine that the extension channel is free and that the data may be transmitted at 40 MHz via both control and extension channels.

Thus, the MAC module 150 may operate in one of the following three modes. In the aggressive mode, the control module 154 may determine CCA based on CCA_c (i.e., CCA=CCA_c). The control module 154 may ignore CCA_e and may determine that data may be transmitted in 40 MHz when CCA_c=0. In the conservative mode, the control module 154 may determine CCA based on a logical OR of CCA_c and CCA_e (i.e., CCA=(CCA_c OR CCA_e)). The control module 154 may determine that data may be transmitted at 40 MHz only when CCA_c=0 and CCA_e=0. Data may not be transmitted at all if CCA_c=1 or CCA_e=1. In the opportunistic mode, the control module 154 may determine CCA based on CCA_c (i.e., CCA=CCA_c). The control module 154 may determine that data may be transmitted at 20 MHz if CCA_c=0 and CCA_e_stretched=1. Data may be transmitted at 40 MHz if CCA_c=0 and CCA_e_stretched=0.

The following examples illustrate some of the advantages of the opportunistic mode over the aggressive and conservative modes. In Example 1, the extension channel may be busy 100% of the time. Data may be transmitted at 40 MHz 100% of the time in the aggressive mode. Data transmitted at 40 MHz may, however, collide 100% of the time with the data in the extension channel in the aggressive mode. This is because in aggressive mode, data is transmitted at 40 MHz irrespective of traffic in the extension channel so long as the control channel is free. Alternatively, in the conservative mode, data may not be transmitted at all when the extension channel is busy 100% of the time. On the other hand, in the opportunistic mode, data may be successfully transmitted (i.e., without collisions) at 20 MHz via the control channel 100% of the time.

In Example 2, the extension channel may be free 100% of the time. Data may be successfully transmitted at 40 MHz 100% of the time in the aggressive mode, at 40 MHz 100% of time in the conservative mode, and at 40 MHz 100% of the time in the opportunistic mode.

In Example 3, the extension channel may be busy 25% of the time. In aggressive mode, data may be transmitted at 40 MHz 100% of the time. Data transmission at 40 MHz may, however, succeed only 75% of the time and may fail 25% of the time due to collisions with the data in the extension channel. Alternatively, in the conservative mode, data may be transmitted at 40 MHz 75% of the time. In the opportunistic mode, on the other hand, data may be transmitted at 40 MHz 75% of the time and at 20 MHz during the remaining 25% of the time. Thus, the opportunistic mode can increase the throughput of the 40 MHz channel and achieve maximum throughput under most conditions of the extension channel.

The control module 154 may determine a value of T that may give other devices that communicate only at 20 MHz (20 MHz devices) a fair opportunity to communicate via the extension channel when the extension channel becomes free. Specifically, the control module 154 may set the value of T that may give the 20 MHz devices sufficient time (equal to T) after the falling edge of the CCA_e signal (i.e., after the extension channel becomes free) to grab the extension channel. Additionally, properly setting the value of T allows for completion of any data exchange that may be ongoing in the extension channel. In other words, increasing the pulse width of the CCA_e signal by time T is equivalent to performing a backoff based on CCA_e.

The control module 154 may control the fairness to the 20 MHz devices by properly tuning the value of T. The control module 154 may tune the value of T based on the amount of activity sensed in the extension channel and the fairness to be given to the 20 MHz devices. For example, the control module 154 may increase T to increase fairness to the 20 MHz devices when the amount of activity sensed in the extension channel is high.

Collisions in the 40 MHz channel may decrease in the opportunistic mode since the control module 154 may utilize the extension channel to transmit data at 40 MHz via the control and extension channels only when no other 20 MHz device grabs the extension channel (i.e., only when CCA_e_stretched=0). Additionally, the throughput of the 40 MHz channel may increase in the opportunistic mode since the control module 154 may utilize the control channel to transmit data at 20 MHz instead of not transmitting data at all when another 20 MHz device grabs the extension channel (i.e., when CCA_e_stretched=1).

Figure 6A:
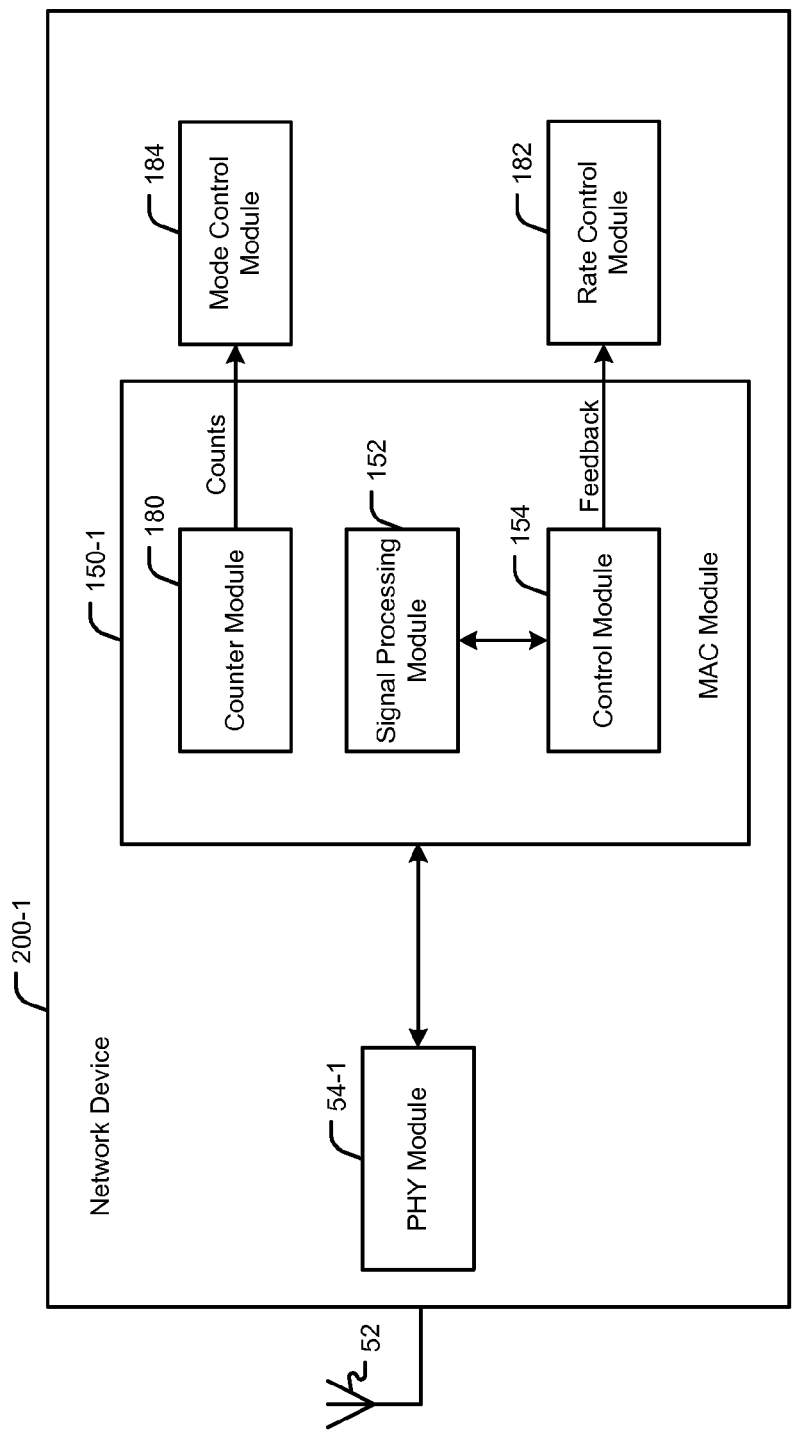
FIG. 6A is a functional block diagram of an exemplary wireless network device according to the present disclosure.

Referring now to FIGS. 6A-6B, a device 200-1 is shown to comprise the antenna 52, the PHY module 54-1, a MAC module 150-1, a rate control module 182, and a mode control module 184. In FIG. 6A, the MAC module 150-1 may comprise the signal processing module 152, the control module 154, and a counter module 180. The rate control module 182 may communicate with the control module 154 and may determine modulation and coding scheme (MCS) rates. The mode control module 184 may communicate with the counter module 180, may receive data shown in the table in FIG. 6B from the counter module 180, and may determine whether the device 200-1 should operate in a pure 20 MHz mode or a pure 40 MHz mode.

Typically, the rate control module 182 may adapt MCS rates based on the quality of the channel. The rate control module 182 may optimally determine the MCS rates when the rate at which data was last transmitted can be known. In the opportunistic mode, however, since the control module 154 may determine whether to transmit data at 20 MHz or 40 MHz in real time, the rate control module 182 may not know the rate at which data was in fact transmitted. Accordingly, the control module 154 may provide feedback to the rate control module 182 regarding the rate at which data was last transmitted in the opportunistic mode.

For a given link, the MCS rates for 20 MHz and 40 MHz modes of transmission may be different, and the rate control module 182 may be able to specify different MCS rates for 20 MHz and 40 MHz modes. For example, a MCS rate R for 20 MHz mode may be supplied with each packet of data to be transmitted. A programmable offset may be used when the packet is transmitted at 40 MHz instead. Specifically, if the offset is −1, a MCS rate (R−1) may be used in the 40 MHz mode unless the MCS rate is 0 or 8. If the offset is +1, a MCS rate (R+1) may be used in the 40 MHz mode unless the MCS rate is 7 or 15. The MCS rate R may be used in the 40 MHz mode if the offset is 0.

Additionally, the counter module 180 may provide the mode control module 184 data shown in the table in FIG. 6B. Specifically, the counter module 180 may comprise a plurality of counters that count cumulative durations for which the conditions shown in the table occur. Based on the data, the mode control module 184 may determine whether the device 200-1 should operate purely in 20 MHz mode, 40 MHz mode, etc.

For example, when the CCA_extension Strong Count is greater than or equal to a predetermined threshold count, the mode control module 184 may determine that activity in the extension channel is strong and that the device 200-1 may operate purely in the 20 MHz mode. Alternatively, when the CCA_extension Weak Count is greater than or equal to a predetermined threshold count, the mode control module 184 may determine that activity in the extension channel is weak and that the device 200-1 may operate purely in the opportunistic 40 MHz mode. Additionally, when the activity in the extension channel is very low, the mode control module 184 may determine that the device 200-1 may operate purely in the 40 MHz mode, etc.

Figure 7A:
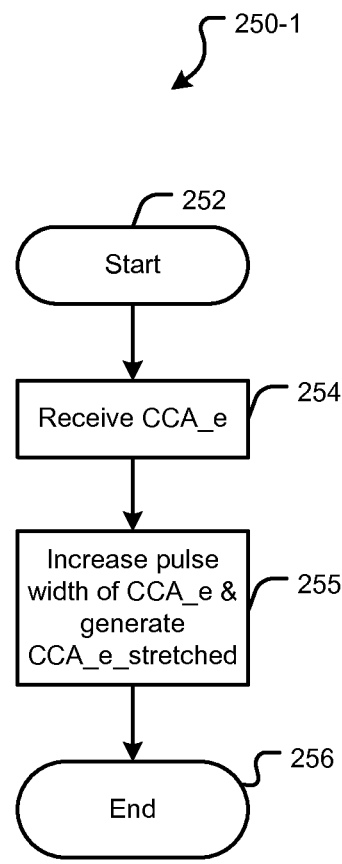
FIGS. 7A and 7B depict flowcharts of a method for transmitting data in an opportunistic mode according to the present disclosure.
Figure 7B:
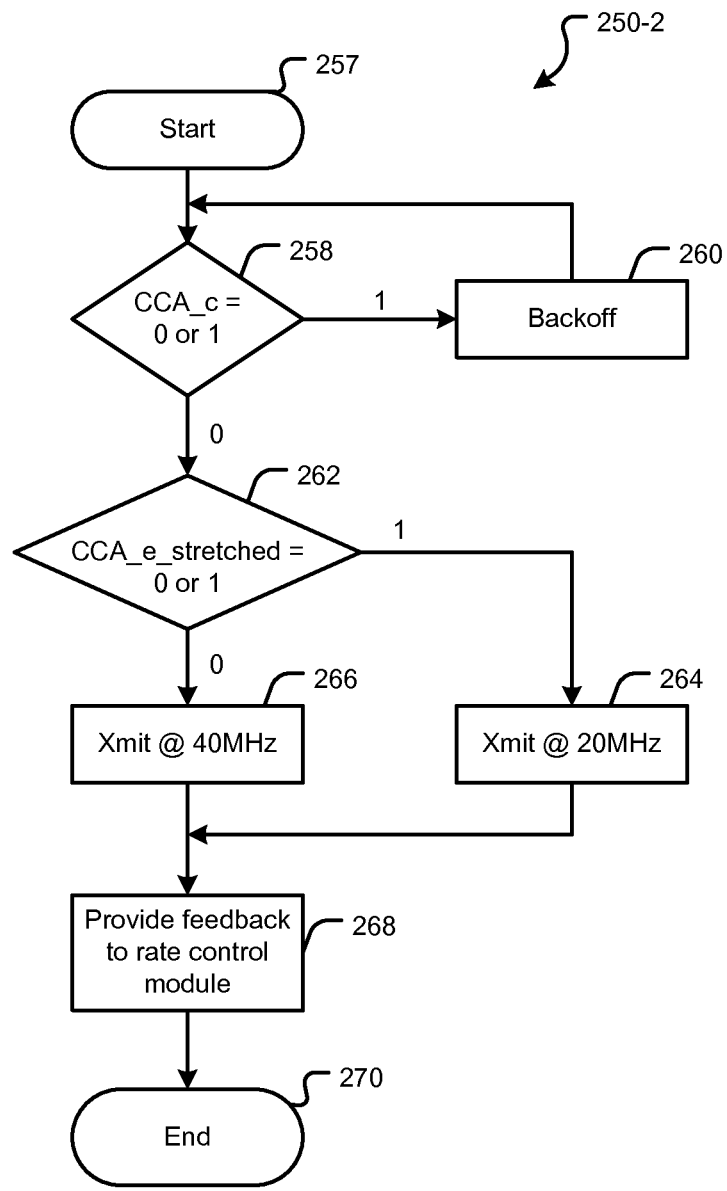

Referring now to FIGS. 7A and 7B, a method 250 for transmitting data in the opportunistic mode is shown. The method 250 comprises steps executed in parallel by the signal processing module 152 and the control module 154. Accordingly, steps executed by the signal processing module 152 are shown in FIG. 7A as method 250-1, and the steps executed by the control module 154 are shown in FIG. 7B as method 250-2. The method 250 comprises the methods 250-1 and 250-2. Although ascending numbers are used for the steps of the methods 250-1 and 250-2, the methods 250-1 and 250-2 are performed in parallel and not sequentially.

In FIG. 7A, the method 250-1 begins at step 252. The signal processing module 152 receives the CCA_e signal in step 254. The signal processing module 152 increases the pulse width of the CCA_e signal by the programmable duration T and generates the CCA_e_stretched signal in step 255. The method 250-1 ends in step 256.

In FIG. 7B, the method 250-2 begins in step 257. The control module 154 determines in step 258 whether CCA_c=1 or CCA_c=0. When CCA_c=1, the MAC module 150-1 backs off in step 260, and the method 250-2 returns to step 257. When CCA_c=0, the control module 154 determines in step 262 whether CCA_e_stretched=1 or CCA_e_stretched=0. When CCA_e_stretched=1, the control module 154 determines in step 264 that data may be transmitted at 20 MHz via the control channel. When CCA_e_stretched=0, the control module 154 determines in step 266 that data may be transmitted at 40 MHz via the control and extension channels. The control module 154 provides feedback to the rate control module 182 in step 268 regarding whether data was transmitted at 20 MHz or 40 MHz. The method 250-2 ends in step 270.

Figure 8B:
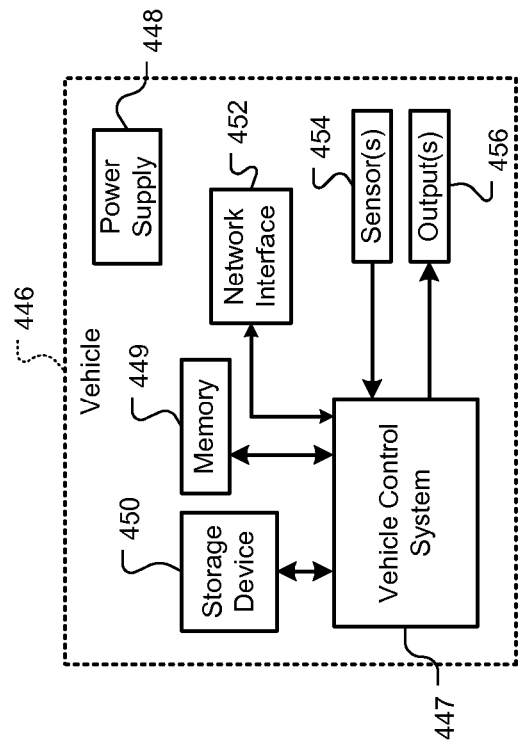
FIG. 8B is a functional block diagram of a vehicle control system.
Figure 8A:
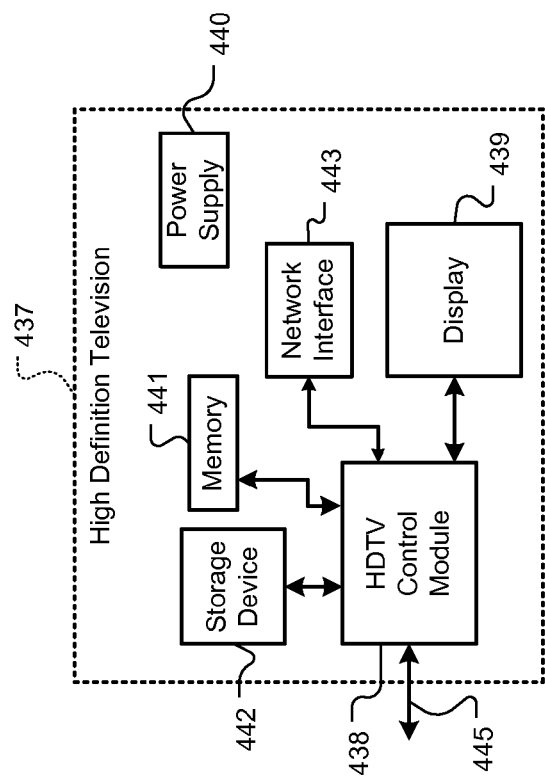
FIG. 8A is a functional block diagram of a high definition television.

Referring now to FIGS. 8A-8E, various exemplary implementations incorporating the teachings of the present disclosure are shown. Referring now to FIG. 8A, the teachings of the disclosure can be implemented in a network interface 443 of a high definition television (HDTV) 437. The HDTV 437 includes a HDTV control module 438, a display 439, a power supply 440, memory 441, a storage device 442, the network interface 443, and an external interface 445. If the network interface 443 includes a wireless local area network interface, an antenna (not shown) may be included.

The HDTV 437 can receive input signals from the network interface 443 and/or the external interface 445, which can send and receive data via cable, broadband Internet, and/or satellite. The HDTV control module 438 may process the input signals, including encoding, decoding, filtering, and/or formatting, and generate output signals. The output signals may be communicated to one or more of the display 439, memory 441, the storage device 442, the network interface 443, and the external interface 445.

Memory 441 may include random access memory (RAM) and/or nonvolatile memory such as flash memory, phase change memory, or multi-state memory, in which each memory cell has more than two states. The storage device 442 may include an optical storage drive, such as a DVD drive, and/or a hard disk drive (HDD). The HDTV control module 438 communicates externally via the network interface 443 and/or the external interface 445. The power supply 440 provides power to the components of the HDTV 437.

Referring now to FIG. 8B, the teachings of the disclosure may be implemented in a network interface 452 of a vehicle 446. The vehicle 446 may include a vehicle control system 447, a power supply 448, memory 449, a storage device 450, and the network interface 452. If the network interface 452 includes a wireless local area network interface, an antenna (not shown) may be included. The vehicle control system 447 may be a powertrain control system, a body control system, an entertainment control system, an anti-lock braking system (ABS), a navigation system, a telematics system, a lane departure system, an adaptive cruise control system, etc.

The vehicle control system 447 may communicate with one or more sensors 454 and generate one or more output signals 456. The sensors 454 may include temperature sensors, acceleration sensors, pressure sensors, rotational sensors, airflow sensors, etc. The output signals 456 may control engine operating parameters, transmission operating parameters, suspension parameters, etc.

The power supply 448 provides power to the components of the vehicle 446. The vehicle control system 447 may store data in memory 449 and/or the storage device 450. Memory 449 may include random access memory (RAM) and/or nonvolatile memory such as flash memory, phase change memory, or multi-state memory, in which each memory cell has more than two states. The storage device 450 may include an optical storage drive, such as a DVD drive, and/or a hard disk drive (HDD). The vehicle control system 447 may communicate externally using the network interface 452.

Figure 8D:
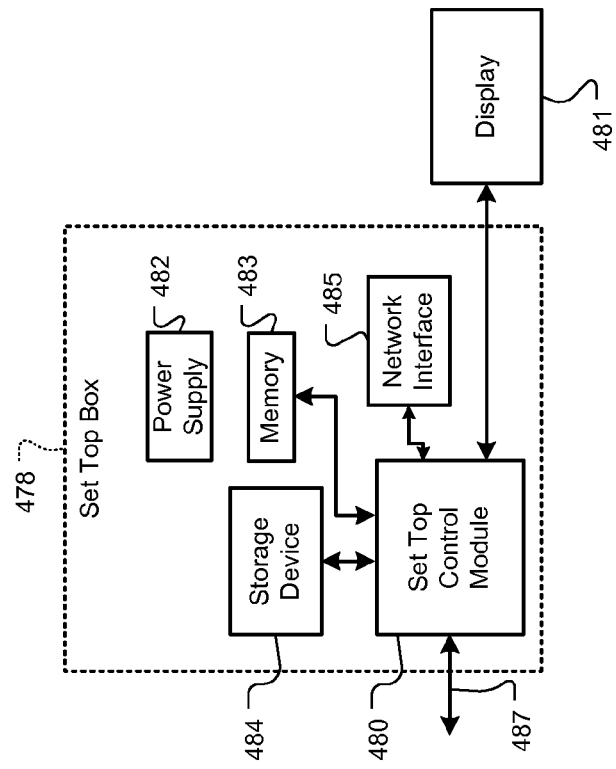
FIG. 8D is a functional block diagram of a set top box.
Figure 8C:
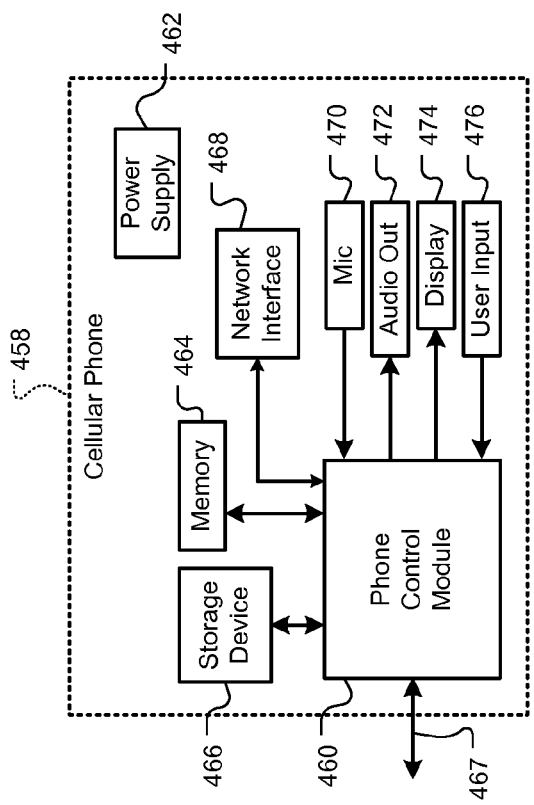
FIG. 8C is a functional block diagram of a cellular phone.

Referring now to FIG. 8C, the teachings of the disclosure can be implemented in a network interface 468 of a cellular phone 458. The cellular phone 458 includes a phone control module 460, a power supply 462, memory 464, a storage device 466, and a cellular network interface 467. The cellular phone 458 may include the network interface 468, a microphone 470, an audio output 472 such as a speaker and/or output jack, a display 474, and a user input device 476 such as a keypad and/or pointing device. If the network interface 468 includes a wireless local area network interface, an antenna (not shown) may be included.

The phone control module 460 may receive input signals from the cellular network interface 467, the network interface 468, the microphone 470, and/or the user input device 476. The phone control module 460 may process signals, including encoding, decoding, filtering, and/or formatting, and generate output signals. The output signals may be communicated to one or more of memory 464, the storage device 466, the cellular network interface 467, the network interface 468, and the audio output 472.

Memory 464 may include random access memory (RAM) and/or nonvolatile memory such as flash memory, phase change memory, or multi-state memory, in which each memory cell has more than two states. The storage device 466 may include an optical storage drive, such as a DVD drive, and/or a hard disk drive (HDD). The power supply 462 provides power to the components of the cellular phone 458.

Referring now to FIG. 8D, the teachings of the disclosure can be implemented in a network interface 485 of a set top box 478. The set top box 478 includes a set top control module 480, a display 481, a power supply 482, memory 483, a storage device 484, and the network interface 485. If the network interface 485 includes a wireless local area network interface, an antenna (not shown) may be included.

The set top control module 480 may receive input signals from the network interface 485 and an external interface 487, which can send and receive data via cable, broadband Internet, and/or satellite. The set top control module 480 may process signals, including encoding, decoding, filtering, and/or formatting, and generate output signals. The output signals may include audio and/or video signals in standard and/or high definition formats. The output signals may be communicated to the network interface 485 and/or to the display 481. The display 481 may include a television, a projector, and/or a monitor.

The power supply 482 provides power to the components of the set top box 478. Memory 483 may include random access memory (RAM) and/or nonvolatile memory such as flash memory, phase change memory, or multi-state memory, in which each memory cell has more than two states. The storage device 484 may include an optical storage drive, such as a DVD drive, and/or a hard disk drive (HDD).

Figure 8E:
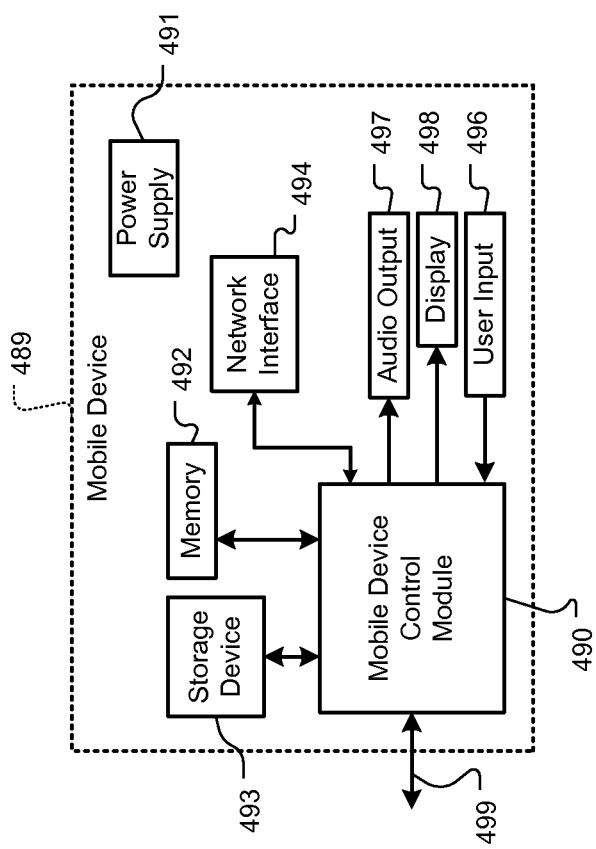
FIG. 8E is a functional block diagram of a mobile device.

Referring now to FIG. 8E, the teachings of the disclosure can be implemented in a network interface 494 of a mobile device 489. The mobile device 489 may include a mobile device control module 490, a power supply 491, memory 492, a storage device 493, the network interface 494, and an external interface 499. If the network interface 494 includes a wireless local area network interface, an antenna (not shown) may be included.

The mobile device control module 490 may receive input signals from the network interface 494 and/or the external interface 499. The external interface 499 may include USB, infrared, and/or Ethernet. The input signals may include compressed audio and/or video, and may be compliant with the MP3 format. Additionally, the mobile device control module 490 may receive input from a user input 496 such as a keypad, touchpad, or individual buttons. The mobile device control module 490 may process input signals, including encoding, decoding, filtering, and/or formatting, and generate output signals.

The mobile device control module 490 may output audio signals to an audio output 497 and video signals to a display 498. The audio output 497 may include a speaker and/or an output jack. The display 498 may present a graphical user interface, which may include menus, icons, etc. The power supply 491 provides power to the components of the mobile device 489. Memory 492 may include random access memory (RAM) and/or nonvolatile memory such as flash memory, phase change memory, or multi-state memory, in which each memory cell has more than two states. The storage device 493 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system comprising:
   a physical layer module configured to
      generate a first clear channel assessment for a first sub-channel of a communication channel, wherein the first clear channel assessment indicates whether the first sub-channel is free or busy, and
      generate a second clear channel assessment for a second sub-channel of the communication channel, wherein the second clear channel assessment indicates whether the second sub-channel is free or busy; and
   a control module configured to
      in response to the second sub-channel being busy, extend a duration of the second clear channel assessment by a predetermined period of time, and
      transmit data via (i) only the first sub-channel or (ii) both the first sub-channel and the second sub-channel based on (a) the first clear channel assessment, (b) the second clear channel assessment, and (c) the extended duration of the first clear channel assessment.

2. The system of claim 1, wherein the control module is configured to:
   transmit data via only the first sub-channel in response to (i) the first sub-channel being free and (ii) the extended duration of the second clear channel assessment indicating the second sub-channel being busy, and
   transmit data via both the first sub-channel and the second sub-channel in response to (i) the first sub-channel being free and (ii) the extended duration of the second clear channel assessment indicating the second sub-channel being free.

3. The system of claim 2, wherein the control module is configured to:
   transmit data via only the first sub-channel at a transmission rate of the first sub-channel in response to (i) the first sub-channel being free and (ii) the extended duration of the second clear channel assessment indicating the second sub-channel being busy, and
   transmit data via both the first sub-channel and the second sub-channel at a transmission rate of the communication channel in response to (i) the first sub-channel being free and (ii) the extended duration of the second clear channel assessment indicating the second sub-channel being free.

4. The system of claim 1, wherein the control module is configured to transmit data via both the first sub-channel and the second sub-channel in response to the first sub-channel being free irrespective of whether the second sub-channel is free or busy.

5. The system of claim 4, wherein the control module is configured to transmit data via both the first sub-channel and the second sub-channel at a transmission rate of the communication channel in response to the first sub-channel being clear irrespective of whether the second sub-channel is free or busy.

6. The system of claim 1, wherein the control module is configured to:
   transmit data via both the first sub-channel and the second sub-channel in response to (i) the first sub-channel and (ii) the second sub-channel being free, and
   not transmit data via both the first sub-channel and the second sub-channel in response to (i) the first sub-channel or (ii) the second sub-channel being busy.

7. The system of claim 6, wherein the control module is configured to transmit data via both the first sub-channel and the second sub-channel at a transmission rate of the communication channel in response to (i) the first sub-channel and (ii) the second sub-channel being free.

8. The system of claim 1, wherein:
   the communication channel has a bandwidth of 40 MHz;
   the first sub-channel (i) includes a control channel of the communication channel and (ii) has a bandwidth of 20 MHz; and
   the second sub-channel (i) includes an extension channel of the communication channel and (ii) has a bandwidth of 20 MHz.

9. The system of claim 1, wherein the predetermined period of time is based on an amount of radio frequency activity in the second sub-channel.

10. A method comprising:
    generating a first clear channel assessment for a first sub-channel of a communication channel, wherein the first clear channel assessment indicates whether the first sub-channel is free or busy;
    generating a second clear channel assessment for a second sub-channel of the communication channel, wherein the second clear channel assessment indicates whether the second sub-channel is free or busy;
    in response to the second sub-channel being busy, extending a duration of the second clear channel assessment by a predetermined period of time; and
    transmitting data via (i) only the first sub-channel or (ii) both the first sub-channel and the second sub-channel based on (a) the first clear channel assessment, (b) the second clear channel assessment, and (c) the extended duration of the first clear channel assessment.

11. The method of claim 10, further comprising:
    transmitting data via only the first sub-channel in response to (i) the first sub-channel being free and (ii) the extended duration of the second clear channel assessment indicating the second sub-channel being busy; and
    transmitting data via both the first sub-channel and the second sub-channel in response to (i) the first sub-channel being free and (ii) the extended duration of the second clear channel assessment indicating the second sub-channel being free.

12. The method of claim 11, further comprising:
    transmitting data via only the first sub-channel at a transmission rate of the first sub-channel in response to (i) the first sub-channel being free and (ii) the extended duration of the second clear channel assessment indicating the second sub-channel being busy, and
    transmitting data via both the first sub-channel and the second sub-channel at a transmission rate of the communication channel in response to (i) the first sub-channel being free and (ii) the extended duration of the second clear channel assessment indicating the second sub-channel being free.

13. The method of claim 10, further comprising transmitting data via both the first sub-channel and the second sub-channel in response to the first sub-channel being free irrespective of whether the second sub-channel is free or busy.

14. The method of claim 13, further comprising transmitting data via both the first sub-channel and the second sub-channel at a transmission rate of the communication channel in response to the first sub-channel being clear irrespective of whether the second sub-channel is free or busy.

15. The method of claim 10, further comprising:
   transmitting data via both the first sub-channel and the second sub-channel in response to (i) the first sub-channel and (ii) the second sub-channel being free, and
   not transmitting data via both the first sub-channel and the second sub-channel in response to (i) the first sub-channel or (ii) the second sub-channel being busy.

16. The method of claim 15, further comprising transmitting data via both the first sub-channel and the second sub-channel at a transmission rate of the communication channel in response to (i) the first sub-channel and (ii) the second sub-channel being free.

17. The method of claim 10, wherein:
   the communication channel has a bandwidth of 40 MHz;
   the first sub-channel (i) includes a control channel of the communication channel and (ii) has a bandwidth of 20 MHz; and
   the second sub-channel (i) includes an extension channel of the communication channel and (ii) has a bandwidth of 20 MHz.

18. The method of claim 10, wherein the predetermined period of time is based on an amount of radio frequency activity in the second sub-channel.

\* \* \* \* \*